(12) United States Patent
Zhang et al.

(10) Patent No.: US 11,434,437 B1
(45) Date of Patent: Sep. 6, 2022

(54) METHOD FOR PRODUCING CHEMICALS FROM CRUDE OIL BY DOUBLE-TUBE PARALLEL MULTI-ZONE CATALYTIC CONVERSION

(71) Applicant: China University of Petroleum, Qingdao (CN)

(72) Inventors: Jinhong Zhang, Qingdao (CN); Chaohe Yang, Qingdao (CN); Yuanyu Tian, Qingdao (CN); Honghong Shan, Dongying (CN); Chunxiao Gao, Dongying (CN); Tong Su, Zaozhuang (CN); Jiming Liu, Karamay (CN)

(73) Assignee: CHINA UNIVERSITY OF PETROLEUM, Qingdao (CN)

( * ) Notice: Subject to any disclaimer, the term of this patent is extended or adjusted under 35 U.S.C. 154(b) by 0 days.

(21) Appl. No.: 17/401,534

(22) Filed: Aug. 13, 2021

(30) Foreign Application Priority Data

Jul. 7, 2021 (CN) .......................... 202110768732.5

(51) Int. Cl.
*C10G 51/02* (2006.01)
*C10G 1/10* (2006.01)
*B01J 35/08* (2006.01)
*C10G 1/00* (2006.01)

(52) U.S. Cl.
CPC ............ *C10G 51/026* (2013.01); *B01J 35/08* (2013.01); *C10G 1/002* (2013.01); *C10G 1/10* (2013.01); *C10G 2300/1003* (2013.01); *C10G 2300/107* (2013.01); *C10G 2300/1014* (2013.01); *C10G 2300/1018* (2013.01); *C10G 2300/1059* (2013.01); *C10G 2300/202* (2013.01); *C10G 2300/205* (2013.01); *C10G 2300/301* (2013.01); *C10G 2300/308* (2013.01); *C10G 2300/70* (2013.01); *C10G 2400/20* (2013.01)

(58) Field of Classification Search
CPC ........ C10G 51/026; C10G 1/002; C10G 1/10; C10G 2300/1003; C10G 2300/1014; C10G 2300/1018; C10G 2300/1059; C10G 2300/107; C10G 2300/202; C10G 2300/205; C10G 2300/301; C10G 2300/308; C10G 2300/70; C10G 2400/20; B01J 35/08
See application file for complete search history.

(56) References Cited

U.S. PATENT DOCUMENTS 7,491,315 B2 * 2/2009 Eng .................. C10G 11/18
585/650

* cited by examiner

*Primary Examiner* — Thuan D Dang
(74) *Attorney, Agent, or Firm* — WPAT, PC (57) ABSTRACT

A method for producing chemicals from crude oil by double-tube parallel multi-zone catalytic conversion is provided. The method may include the following steps: feeding the crude oil directly or separating the crude oil into light and heavy components by flash evaporation or distillation after desalination and dehydration; strengthening the contact and reaction between oil gas and catalyst by using two parallel reaction tubes with novel structure, controlling the reaction by zones, carrying out optimal combination on feeding modes according to different properties of reaction materials, controlling suitable reaction conditions for different materials, and increasing the production of light olefins and aromatics.

10 Claims, 2 Drawing Sheets

METHOD FOR PRODUCING CHEMICALS FROM CRUDE OIL BY DOUBLE-TUBE PARALLEL MULTI-ZONE CATALYTIC CONVERSION

TECHNICAL FIELD OF THE INVENTION

The invention relates to the technical field of petroleum processing, in particular to a method for producing chemicals from crude oil by double-tube parallel multi-zone catalytic conversion.

BACKGROUND OF THE INVENTION

Ethylene, propylene and other light olefins are basic organic synthetic raw materials for the petrochemical industry. With the rapid development of the world economy, the market demand therefor has been increasing year by year, and the growth rate of propylene demand has exceeded that of ethylene. At present, more than 90% of ethylene and nearly 70% of propylene in the world are derived from the steam cracking process using ethane, naphtha, light diesel oil and other light petroleum hydrocarbons as raw materials. However, the reaction severity for steam cracking is high, the reaction temperature is even higher than 1,100° C., and the residence time is shortened to less than 0.2 s, so there is little room for technological progress. Moreover, due to the reaction mechanism of the process, it is difficult to greatly increase the yield of propylene as the main by-product thereof. Because of the high reaction temperature of the steam cracking process, it is necessary to carry out cryogenic separation on cracking products. In addition, due to the high content of hydrogen and methane in small molecules of the product, the energy consumption is high and the energy utilization rate is low in the compression process. For these factors, the steam cracking process needs to consume a lot of energy, and the energy consumption accounts for 40% of the whole petrochemical enterprise. With the increasing heavy petroleum resources the naphtha yield is declining, and the shortage of light hydrocarbon raw materials is increasingly prominent for steam cracking units, while processing heavy raw materials will cause severe coking in furnace tubes. Therefore, the development of FCC (fluid catalytic cracking) technology for direct production of light olefins from heavy oil raw materials has attracted widespread attention in recent years.

Aromatics (such as benzene, toluene, xylene, referred to as BTX) are important organic chemical raw materials second only to ethylene and propylene in terms of yield and scale, and derivatives thereof are widely used in the production of synthetic fibers, synthetic resins, synthetic rubber and other chemical products and various fine chemicals. With the development of petrochemical industry and textile industry, the demand for aromatics in the world is increasing. Aromatics were initially produced from coal tar. With the development of petroleum refining industry and petrochemical industry, the production of aromatics has shifted to a petrochemical route with catalytic reformate and cracked gasoline as the main raw materials. Catalytic reforming plays a very important role in the production of aromatics, and nearly 70% of the BTX demand in the world comes from catalytic reforming. However, the raw material for catalytic reformers is mainly naphtha, and the content of impurities in the raw material is strictly limited. Pretreatment is usually required, including pre-fractionation, pre-dearsenification and pre-hydrogenation. Due to the limited naphtha resources in China, it will be bound to compete with ethylene production devices for raw materials in order to increase the yield of aromatics by catalytic reforming.

According to Chinese patent application publication No. CN1031834A and U.S. Pat. Nos. U.S. Pat. Nos. 3,541,179 and 3,647,682, the production of light olefins is increased by improving the catalyst formulation, which is quite different from the invention. Chinese patent application publication No. CN101462916A discloses a method for producing light olefins by catalytic cracking of petroleum hydrocarbons. Before catalytic cracking reaction, petroleum hydrocarbons are contacted with a dehydrogenation catalyst for dehydrogenation reaction, which can reduce the reaction temperature and thus save energy. However, the method is only applicable to light petroleum hydrocarbons such as naphtha or light diesel oil. Chinese patent application publication No. CN101684057A discloses a method for pre-separation of cracking raw materials, which is quite different from the invention. Chinese patent application publication No. CN1504542A discloses a method for producing light olefins by coupling catalytic cracking of organic oxygen-containing compounds and petroleum hydrocarbons, which is quite different from the invention.

According to Chinese patent application publication No. CN1234426A (DCC process), by adding a dense phase fluidized bed to a conventional riser reactor, with a relatively high reaction temperature (500-600° C.) and a specially designed catalyst, the catalytic cracking of heavy petroleum hydrocarbons and the catalytic aromatization of light petroleum hydrocarbons can be promoted to increase the production of light olefins by a certain amount and increase the content of aromatics in gasoline. However, the presence of the dense phase fluidized bed can promote the hydrogen transfer reaction, so as to reduce the selectivity of light olefins. According to Chinese patent application publication No. CN1218786A (CPP process), the yield of ethylene and propylene is further increased by improving the catalyst formulation and raising the reaction temperature to 600-750° C. on the basis of the DCC process. Chinese patent application publication No. CN1069016A (HCC process) discloses a method for directly converting heavy hydrocarbons in a fluidized bed or a plug flow reactor to mainly produce ethylene and also produce propylene, butylene and light aromatics. In the method, a relatively high reaction temperature of 650-900° C. and a large ratio of catalyst to oil are used for promoting the conversion of heavy hydrocarbons and a relatively short reaction time is used for suppressing the secondary reaction to increase the yield of olefins. Chinese patent application publication No. CN1083092A discloses a catalytic pyrolysis method for producing ethylene and propylene. An acidic molecular sieve catalyst containing a pillared interlayered clay molecular sieve and/or five-membered ring high-silicon zeolite containing rare earth is used in the disclosure. A relatively high reaction temperature of 700-750° C. and a large water-oil ratio (over 40%) are recommended. The above inventions have made a breakthrough in the field of direct production of light olefins from heavy petroleum hydrocarbon. However, the main methods adopted are to greatly improve the reaction severity and to use catalysts with higher selectivity of olefins, but not much work has been done in the process optimization, and all of the methods have the problem of high yield of low-value products. For a rapid catalytic cracking reaction process for a heavy oil under high severity, if the production of methane, ethane and other low-value products in the cracked gas can be inhibited through the optimal combination of materials with different reaction properties in the device itself, the yield of light olefins can be improved, and the hydrogen distribution can be optimized, so that every drop of oil can be used more efficiently.

The two-stage riser fluid catalytic cracking (TSRFCC) technology developed by China University of Petroleum (East China) (Chinese patent publication No. CN2380297Y and Chinese patent application publication No. CN1302843A), divides a conventional long riser into two sections, forming two-stage tandem of oil gas, and two-way catalyst relay, improving the average activity of the catalyst. Sectional feeding of cycle oil and fresh feed with different cracking properties is carried out to eliminate the competitive adsorption reaction therebetween. Furthermore, the catalytic cracking reaction of heavy oils can be strengthened, the conversion depth of raw materials can be improved, and the adverse secondary reaction can be reduced by controlling different reaction severities. According to Chinese patent application publication No. CN1438296A, on the basis of the TSRFCC technology, a third riser is added, which can effectively reform or crack gasoline to produce light olefins. However, due to the complex structure of the device, it has not been used in industry at present. Chinese patent application publication No. CN101074392A discloses a method for producing propylene and high-quality gasoline and diesel oil by two-stage catalytic cracking. The method makes full use of the advantages of the TSRFCC technology. A catalyst rich in shape-selective molecular sieves is used. Optimal combination of feeding modes is carried out on reaction materials with different properties. Furthermore, suitable reaction conditions are controlled for different materials, the reaction temperature of the first stage is 480-520° C., the reaction temperature of the second stage is 520-550° C., and the residence time is 1-2 s. The method can increase the ratio of catalyst to oil without greatly increasing the riser outlet temperature, promote the catalytic cracking reaction, and inhibit the formation of dry gas and coke. However, by the method, only a certain amount of propylene can be increased, the ethylene yield is low and the content of aromatics in gasoline is low. Chinese patent application publication Nos. CN1557915A, CN1069054A and CN1237477A, PCT patent application publication No. WO99/57230, and U.S. patent publication Nos. U.S. Pat. Nos. 7,261,807, 4,980,053 and U.S. Pat. No. 6,569,316, MAXOFIN process, PetroFCC process, LOCC process, NEXCC process, MILOS process, and HS-FCC process also have the problems of low yield of light olefins and low content of aromatics in gasoline.

SUMMARY OF THE INVENTION

An objective of the invention is to provide a method for producing chemicals from crude oil by double-tube parallel multi-zone catalytic conversion, so as to solve the above-mentioned problems in the prior art, increase light olefin yield and the content of aromatics in cracked gasoline, and inhibit the production of low-value products.

In order to achieve the above-mentioned objective, the invention provides the following technical solutions:

Specifically, the invention provides a method for producing chemicals from crude oil by double-tube parallel multi-zone catalytic conversion, comprising the following steps:

(1) feeding a first raw material at a gas inlet end of a first reaction tube for cracking reaction in a light alkane reaction zone in the presence of a high temperature regenerated catalyst;

(2) feeding a preheated second raw material in the middle of the first reaction tube and mixing with materials from the light alkane reaction zone before entering a first heavy oil reaction zone for cracking reaction, wherein the first oil gas after the reaction and the spent catalyst enter a gas-solid separator for separation, the first oil gas passes through a fractionation system for the separation of light alkanes, light olefins, gasoline, cycle oil and oil slurry, and the gasoline enters an aromatics extraction unit (also referred to as aromatics extractor) and is separated into aromatics and aromatics raffinate; and the spent catalyst subjected to steam stripping enters a regeneration reactor for regeneration reaction with an oxidant;

(3) feeding a third raw material at a gas inlet end of a second reaction tube for cracking reaction in a gasoline reaction zone in the presence of a high temperature regenerated catalyst, wherein the third raw material is a light hydrocarbon or alcohol raw material; and (4) feeding the cycle oil separated in Step (2) or a hydrotreated cycle oil in the middle of the second reaction tube and mixing with materials from the gasoline reaction zone before entering a second heavy oil reaction zone for cracking reaction to obtain a second oil gas and a spent catalyst, wherein the second oil gas is mixed with the first oil gas, the resulting mixture enters a fractionation system for separation of light alkanes, light olefins, gasoline, cycle oil and oil slurry, and the gasoline enters an aromatics extraction unit and is separated into aromatics and aromatics raffinate; and the spent catalyst subjected to steam stripping enters a regeneration reactor for regeneration reaction with an oxidant.

Further, reaction conditions for the light alkane reaction zone are as follows: reaction temperature: 600-800° C., preferably 650-750° C.; preheating temperature of the first raw material: 40-200° C.; mass ratio of catalyst to oil: 5-30; and reaction time: 0.1-5.0 s, preferably 0.2-1.0 s;

reaction conditions for the first heavy oil reaction zone are as follows: reaction temperature: 500-700° C., preferably 550-650° C.; preheating temperature of the second raw material: 150-250° C.; mass ratio of catalyst to oil: 5-30; and reaction time: 0.1-5.0 s, preferably 0.5-1.0 s;

reaction conditions for the gasoline reaction zone are as follows: reaction temperature: 600-800° C., preferably 650-750° C.; preheating temperature of the third raw material: 40-200° C.; mass ratio of catalyst to oil: 5-30; and reaction time: 0.1-5.0 s, preferably 0.2-1.0 s; and reaction conditions for the second heavy oil reaction zone are as follows: reaction temperature: 500-700° C., preferably 550-650° C.; preheating temperature of the cycle oil: 200-350° C.; mass ratio of catalyst to oil: 5-30; reaction time: 0.1-5.0 s, preferably 0.5-1.0 s; and reaction temperature of the regeneration reactor: 600-950° C.

Further, the first reaction tube and the second reaction tube are downers, risers or composite bed reactors with swirl feed structures; and the first raw material and the third raw material are fed in a swirl feed mode.

Further, the second raw material comprises one or more of crude oil, heavy components of crude oil, atmospheric gas oil, vacuum gas oil, coking gas oil, atmospheric residual oil, vacuum residual oil, deasphalted oil, oil sands bitumen, shale oil, coal tar, paraffin, plastics, rubber, rubber oil, synthetic oil, and animal and vegetable oils rich in hydrocarbons.

Further, in Step (1) and Step (3), the high temperature regenerated catalyst comprises a regenerated catalyst from a regenerator or a regenerated catalyst cooler or a catalyst with temperature or activity changed from a catalyst mixing tank.

Further, the first raw material and the third raw material comprise one or more of dry gas, light alkanes, alcohols, light components of crude oil, gasoline aromatics raffinate, straight run gasoline, condensate oil, catalytically cracked gasoline, thermal cracking gasoline, coker gasoline, visbreaking gasoline and pyrolysis to ethylene gasoline.

Further, the high temperature regenerated catalyst comprises one or more of microspheres loaded with alkali and/or alkaline earth metals, calcium aluminate, calcium ferrite, magnesia-alumina spinel, silicate aluminate, calcium silicate, magnesium silicate, alumina and semi-coke.

Further, the oxidant is one or more of oxygen, air, oxygen-rich air, water vapor, carbon dioxide and methane.

Further, the regeneration reactor is the combination of one or more of riser regenerator, turbulent fluidized bed regenerator and bubbling fluidized bed regenerator.

Further, the gas-solid separator is the combination of one or more of inertial separator, horizontal cyclone separator and vertical cyclone separator.

The invention may achieve the following technical effects:

The invention provides a method for catalytic cracking of crude oil to produce chemicals such as light olefins and aromatics in the petrochemical field. The method can process both light and heavy crude oil. The crude oil can be desalted and dehydrated before processing, or directly processed. The method mainly comprises the following steps: using a reactor with two parallel reaction tubes for reactions by zone to strengthen the contact and reaction between oil gas and catalyst, using a catalyst with high olefin selectivity, hydrothermal stability and heavy metal resistance, carrying out optimal combination on feeding modes according to different properties of reaction materials, controlling suitable reaction conditions for different materials, carrying out zone control according to the cracking characteristics of light and heavy components to strengthen the conversion, and using swirl feed structure to strengthen the contact and reaction between light alkanes and catalyst. High-temperature catalytic steam cracking of light alkanes solves the problem of difficult conversion of small molecular alkanes, and provides a critical hydrogen environment for cracking of heavy components, improves the yield of the target product, and reduces the coke yield. The purposes of increasing the yield of light olefins and increasing the content of aromatics in cracked gasoline are eventually achieved by multiple measures.

Compared with the prior art, the invention can obtain a better product distribution on the premise of producing more light olefins, which not only well inhibits the generation of low-value products, but also has a higher content of aromatics in gasoline. When a special calcium-based solid base catalyst is used, with Daqing crude oil as the raw material, and the outlet temperature of the first and second reaction tube reactors is 620° C., the yield of ethylene and propylene is higher than 50%, and the content of aromatics in gasoline is higher than 85%. Therefore, the method has a great prospect of application and popularization.

BRIEF DESCRIPTION OF THE FIGURES

To describe the technical solution in the embodiments in the invention or in the prior art in a more clear way, figures to be used in the embodiments are simply introduced as follows. Apparently, figures in the following description are only some embodiments of the invention, and for a person skilled in the art, other figures may also be obtained based on these figures without paying any creative effort.

DETAILED DESCRIPTION OF THE PREFERRED EMBODIMENTS

Multiple exemplary embodiments of the invention are described in detail. Such detailed description shall not be considered as a limitation of the invention, but shall be understood as a more detailed description of certain aspects, features and embodiments of the invention.

It shall be understood that the terms described in the invention are used only to describe particular embodiments and are not intended to limit the invention. In addition, the range of values in the invention shall be understood to mean that each intermediate value between the upper and lower limits of the range is also specifically disclosed. The intermediate value in any stated value or within the stated range and each small range between any other stated values or intermediate values within the range are also included in the invention. These small ranges of upper and lower limits may be included or excluded independently.

Unless otherwise stated, all technical and scientific terms used herein have the same meaning that would normally be understood by those of ordinary skill in the art described in the invention. Although the invention only describes the preferred method and material, any method and material similar or equivalent to those described herein may also be used in the implementation or test of the invention. All literatures referred to in the Specification are incorporated by citation to disclose and describe methods and/or materials relevant to the same. In the event of conflict with any incorporated literature, the contents of the Specification shall prevail.

It will be readily apparent to a person skilled in the art that various improvements and variations can be made to the implementation of the Specification of the prevent invention without departing from the scope or spirit of the prevent invention. Other implementations derived from the Specification of the invention are obvious to a person skilled in the art. The Specification and embodiments of the invention are for illustrative purposes only.

The terms "including", "comprising", "having" and "containing" used herein are open terms, which means including but not limited to.

Figure 2:
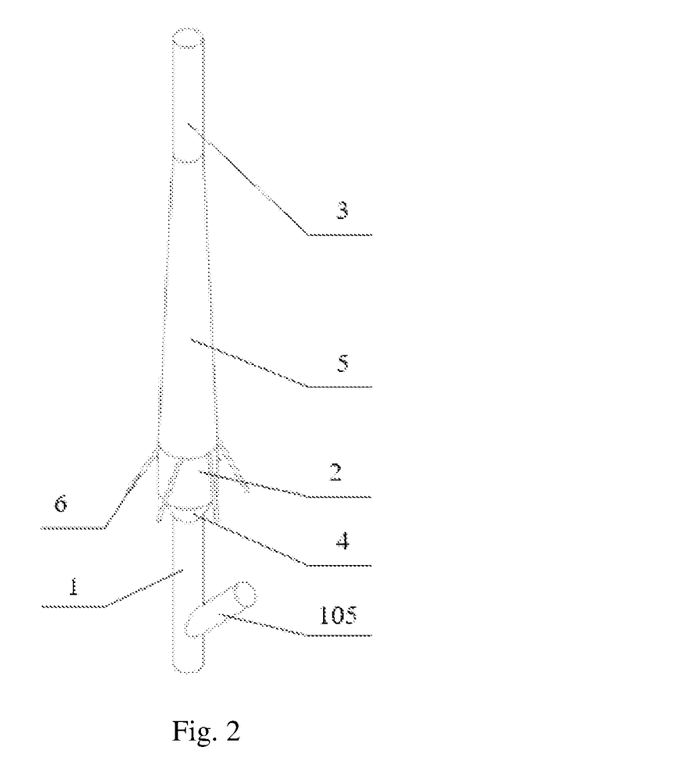
FIG. 2 is a structural diagram of a riser with swirl feed structure.

A downer (i.e., downward reaction tube), a riser (i.e., upward reaction tube) or a composite bed reaction zone with or without swirl feed structure may be adopted in the tubular reaction zone of the invention, wherein the first raw material and the third raw material can be fed in a swirl feed mode. The structural diagram of a riser with swirl feed structure in the invention is as shown in FIG. 2, a reaction tube body thereof has a total height of 9.2m, a pre-rising section 1 has a diameter of 16 mm and a height of 2.4m; an expanding section 2 has a diameter of 32 mm and a height of 2 m, a necking section 3 has a diameter of 16 mm and a height of 4.6m; a gradual expanding section 4 has a bottom cone angle of 60°, and a gradual expanding section 5 has a top cone angle of 5°. Feed nozzles 6 are tubular, the included angle between a jet direction of a nozzle 6 and the axial direction of the reaction tube body is 30°, and the included angle between the projection direction on a cross section of the reaction tube body and the tangent direction is 60°. There are six nozzles evenly arranged along the circumferential direction of an expanding section 7. Similarly, the structure can also be used in the downer, which can be obtained by a person skilled in the art based on improvements to the riser, and thus will not be described here. The radial speed and circumferential speed of the oil gas and the catalyst are increased by feeding in the expanding sections and using a plurality of injection terminals to increase contact points of oil-catalyst to promote radial mass transfer and heat transfer of the catalyst, achieve rapid and uniform mixing of oil-catalyst, and strengthen the catalytic reaction.

The specific equipment in the catalytic cracking reactor used in the invention, such as regenerator, reaction tube, gas-solid separator, cyclone separator or fractionation system are commonly used in the field of petroleum processing, and can be put into use after proper modification and assembly according to the technological requirements of the invention, which is conducive to industrial implementation.

Embodiment 1

A riser reaction tube with swirl feed structure is taken as an example in the embodiment. After desalination and dehydration, the crude oil is separated into light components and heavy components by boiling points through a flash evaporation or distillation process. Fractions lower than 200° C. are light components, and fractions higher than 200° C. are heavy components.

Figure 1:
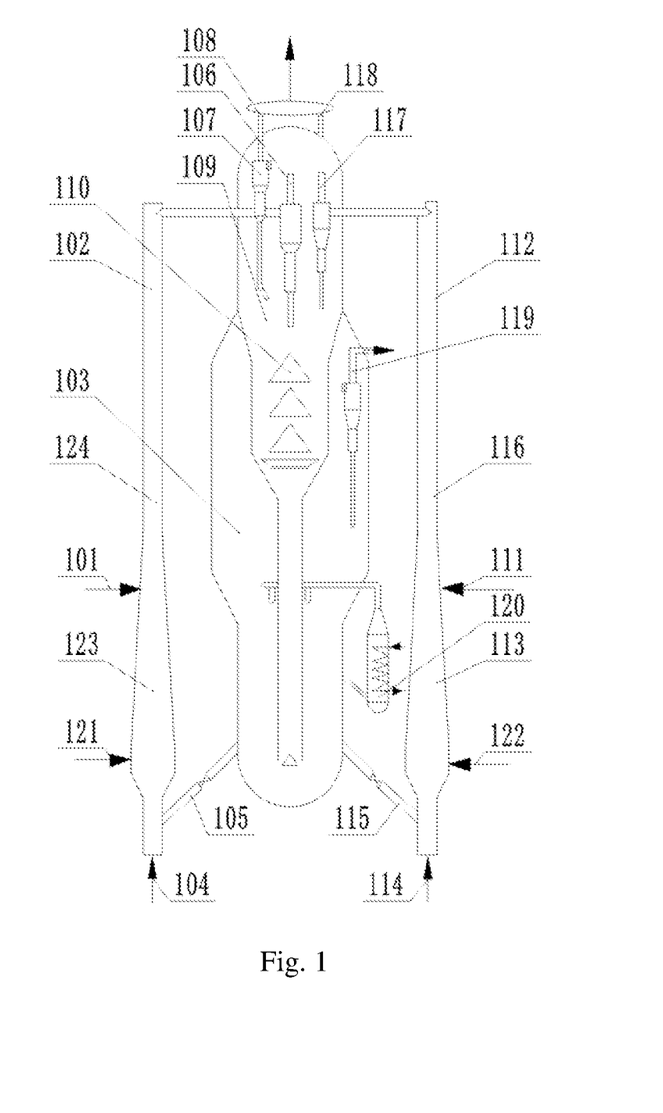
FIG. 1 is a schematic diagram of a process flow and a device in Embodiment 1 of the invention.

Referring to the schematic diagram of a process flow and a device shown in FIG. 1, a light alkane 121 is injected from a lower portion of a first riser reactor 102 for contact and reaction with a high temperature regenerated catalyst delivered by a regenerator inclined tube 105 from a regenerator 103 and raised by a pre-rising steam or a rising dry gas 104. After reaction at 600-800° C. under a pressure of 0.1-0.4 MPa with a ratio of catalyst to oil of 5-30 for 0.1-5.0 s, the reaction product leaves a light alkane reaction zone 123 and enters a first heavy oil reaction zone 124. At the bottom of the first heavy oil reaction zone, the reaction product is mixed with a heavy component 101 of the crude oil preheated to 150-250° C. for reaction at 500-700° C. under a pressure of 0.1-0.4 MPa with a ratio of catalyst to oil of 5-30 for 0.1-5.0 s, then the reaction product enters a gas-solid separator 106 and a settler top spin 107 for oil-catalyst separation. The main reaction oil gas 108 enters a fractionating tower for separation of light alkanes, light olefins, gasoline, cycle oil and oil slurry. The gasoline enters an aromatics extraction unit and is separated into aromatics and aromatics raffinate. The spent catalyst enters a stripping stage 110 through a settler 109 for stripping, and then enters a regenerator 103 for burning regeneration. After being preheated to 40-200° C., the separated gasoline aromatics raffinate and a light component 122 of the crude oil enter a gasoline reaction zone 113 of a second riser reactor 112 for contact and reaction with a high temperature regenerated catalyst delivered by a regenerator inclined tube 115 from the regenerator 103, and raised by a pre-rising steam or a rising dry gas 114. After reaction at 600-800° C. under a pressure of 0.1-0.4 MPa with a ratio of catalyst to oil of 5-30 for 0.1-2.0 s, the reaction product enters a second heavy oil reaction zone 116 for contact and reaction with a cycle oil feed 111 preheated to 200-350° C. at the bottom of the second heavy oil reaction zone. After reaction at a reaction temperature of 500-700° C. under a pressure of 0.1-0.4 MPa with a ratio of catalyst to oil of 5-30 for 0.1-5.0 s, the reaction product enters an efficient gas-solid separator 117 and a top spin 107 for oil-catalyst separation. The reaction oil gas 118 and the main reaction oil gas 108 are mixed in the settler 109 and then enter the fractionating tower for separation of light alkanes, light olefins, gasoline, cycle oil and oil slurry. The gasoline enters the aromatics extraction unit and is separated into aromatics and aromatics raffinate. The spent catalyst enters the stripping stage 110 through the settler 109 for stripping, and then enters the regenerator 103 through the stripping stage for burning regeneration. The flue gas leaves the system after being separated from solid particles by the cyclone separator 119. When the coke yield is high, an external regenerated catalyst cooler 120 may be provided to cool the regenerated catalyst.

Embodiment 2

A riser reaction tube with swirl feed structure is adopted, and the crude oil is fed directly.

Referring to the schematic diagram of a process flow and a device shown in FIG. 1, a light alkane 121 is injected from a lower portion of a first riser reactor 102 for contact and reaction with a high temperature regenerated catalyst delivered by a regenerator inclined tube 105 from a regenerator 103 and raised by a pre-rising steam or a rising dry gas 104. After reaction at 600-800° C. under a pressure of 0.1-0.4 MPa with a ratio of catalyst to oil of 5-30 for 0.1-5.0 s, the reaction product leaves a light alkane reaction zone 123 and enters a first heavy oil reaction zone 124. At the bottom of the first heavy oil reaction zone, the reaction product is mixed with the crude oil 101 preheated to 150-250° C. for reaction at 500-700° C. under a pressure of 0.1-0.4 MPa with a ratio of catalyst to oil of 5-30 for 0.1-5.0 s, then the reaction product enters a gas-solid separator 106 and a settler top spin 107 for oil-catalyst separation. The main reaction oil gas 108 enters a fractionating tower for separation of light alkanes, light olefins, gasoline, cycle oil and oil slurry. The gasoline enters an aromatics extraction unit and is separated into aromatics and aromatics raffinate. The spent catalyst enters a stripping stage 110 through a settler 109 for stripping, and then enters a regenerator 103 for burning regeneration. After being preheated to 40-200° C., the separated gasoline aromatics raffinate 122 enters a gasoline reaction zone 113 of a second riser reactor 112 for contact and reaction with a high temperature regenerated catalyst delivered by a regenerator inclined tube 115 from the regenerator 103, and raised by a pre-rising steam or a rising dry gas 114. After reaction at 600-800° C. under a pressure of 0.1-0.4 MPa with a ratio of catalyst to oil of 5-30 for 0.1-2.0 s, the reaction product enters a second heavy oil reaction zone 116 for contact and reaction with a cycle oil feed 111 preheated to 200-350° C. at the bottom of the second heavy oil reaction zone. After reaction at a reaction temperature of 500-700° C. under a pressure of 0.1-0.4 MPa with a ratio of catalyst to oil of 5-30 for 0.1-5.0 s, the reaction product enters an efficient gas-solid separator 117 and a top spin 107 for oil-catalyst separation. The reaction oil gas 118 and the main reaction oil gas 108 are mixed in the settler 109 and then enter the fractionating tower for separation of light alkanes, light olefins, gasoline, cycle oil and oil slurry. The gasoline enters the aromatics extraction unit and is separated into aromatics and aromatics raffinate. The spent catalyst enters the stripping stage 110 through the settler 109, and then enters the regenerator 103 through the stripping stage for burning regeneration. The flue gas leaves the system after being separated from solid particles by the cyclone separator 119. When the coke yield is high, an external regenerated catalyst cooler 120 may be provided to cool the regenerated catalyst.

Embodiment 3

A downer reaction tube with swirl feed structure is adopted. After desalination and dehydration, the crude oil is separated into light components and heavy components by boiling points through a flash evaporation or distillation process. Fractions lower than 200° C. are light components, and fractions higher than 200° C. are heavy components. Refer to Embodiment 1 for the specific process.

Embodiment 4

A downer reaction tube with swirl feed structure is adopted, and the crude oil is fed directly. Refer to Embodiment 2 for the specific process.

Comparative Embodiment 1

Using Daqing crude oil as the raw material and a calcium-based solid base catalyst, a first reaction tube was fed with the crude oil, with a reaction temperature of 620° C. and a reaction time of 1.5 s; and a second reaction tube was fed with cycle oil, with a reaction temperature of 620° C. and a reaction time of 1.8 s.

In order to verify the effect of the invention, the technological process in Embodiments 1-4 and Comparative Embodiment 1 is adopted to carry out a test on a catalytic cracking unit (also referred to as catalytic cracker), and the test results are shown in the table below.

The crude oil used in the test is Daqing crude oil, and the properties of the raw materials are shown in Table 1. The above technological process is adopted, and the raw materials are fed into the catalytic cracking unit according to the process shown in Embodiments 1-4 and Comparative Embodiment 1 for reaction. The specific technological conditions of each reaction zone are shown in Table 2, and the distribution of the resulting products is shown in Table 3. Compared with Comparative Embodiment 1, the process of the invention can increase the yield of ethylene and propylene by about 10%, and the yield of gasoline aromatics by about 8%, and the yield of light olefins and aromatics is significantly increased.

TABLE 1

| General Properties of Crude Oil | | | |
|---|---|---|---|
| | | | Daqing crude oil |
| Elemental composition, wt % | C | | 86.14 |
| | H | | 13.21 |
| | S | | 0.26 |
| | N | | 0.19 |
| Naphtha content, wt % | | | 6.62 |
| Metal content, ug · g$^{-1}$ | V | | 0.05 |
| | Ni | | 4.26 |
| Carbon residue, wt % | | | 3.2 |
| Density (20° C.), kg · m$^{-3}$ | | | 870 |
| Boiling range, wt % | Initial boiling point ~200° C. | | 6.62 |
| | 200~350° C. | | 18.47 |
| | >350° C. | | 74.07 |

TABLE 2

| Process | Embodiment 1 | Embodiment 2 | Embodiment 3 | Embodiment 4 | Comparative Embodiment 1 |
|---|---|---|---|---|---|
| Catalyst | Calcium-based solid base | Calcium-based solid base | Calcium-based solid base | Calcium-based solid base | Calcium-based solid base |
| Raw material | Daqing crude oil | Daqing crude oil | Daqing crude oil | Daqing crude oil | Daqing crude oil |
| Gas inlet end of the first reaction tube | Recycle light alkanes | Recycle light alkanes | Recycle light alkanes | Recycle light alkanes | Crude oil |
| Middle feed inlet of the first reaction tube | Heavy components of crude oil | Crude oil | Heavy components of crude oil | Crude oil | |
| Gas inlet end of the second reaction tube | Light components of crude oil and recycle gasoline aromatics raffinate | Recycle gasoline aromatics raffinate | Light components of crude oil and recycle gasoline aromatics raffinate | Recycle gasoline aromatics raffinate | Cycle oil |
| Middle feed inlet of the second reaction tube | Cycle oil | Cycle oil | Cycle oil | Cycle oil | |
| Operating conditions | | | | | |
| Temperature of light alkane reaction zone, ° C. | 720 | 720 | 720 | 720 | |
| Preheating temperature of raw material in the light alkane reaction zone, ° C. | 100 | 100 | 100 | 100 | |

TABLE 2-continued

Contrastive Analysis of Different Processing Schemes

| Process | Embodiment 1 | Embodiment 2 | Embodiment 3 | Embodiment 4 | Comparative Embodiment 1 |
|---|---|---|---|---|---|
| Mass ratio of catalyst to oil in the light alkane reaction zone | 25 | 25 | 25 | 25 | |
| Reaction pressure in the light alkane reaction zone, MPa | 0.1 | 0.1 | 0.1 | 0.1 | |
| Light alkane reaction time, s | 0.8 | 0.8 | 0.8 | 0.8 | |
| Temperature of the first heavy oil reaction zone, °C. | 620 | 620 | 620 | 620 | 620 |
| Preheating temperature of raw material in the first heavy oil reaction zone, °C. | 220 | 220 | 220 | 220 | 220 |
| Mass ratio of catalyst to oil in the first heavy oil reaction zone | 6 | 6 | 6 | 6 | 6 |
| Reaction pressure in the first heavy oil reaction zone, MPa | 0.1 | 0.1 | 0.1 | 0.1 | |
| The first heavy oil reaction time, s | 0.8 | 0.8 | 0.8 | 0.8 | 1.5 |
| Temperature of gasoline reaction zone, °C. | 680 | 680 | 680 | 680 | |
| Preheating temperature of raw material in the gasoline reaction zone, °C. | 200 | 200 | 200 | 200 | |
| Mass ratio of catalyst to oil in the gasoline reaction zone | 6 | 6 | 6 | 6 | |
| Reaction pressure in the gasoline reaction zone, MPa | 0.1 | 0.1 | 0.1 | 0.1 | |
| Gasoline reaction time, s | 0.6 | 0.6 | 0.6 | 0.6 | |
| Temperature of the second heavy oil reaction zone, °C. | 620 | 620 | 620 | 620 | 620 |
| Preheating temperature of raw material in the second heavy oil reaction zone, °C. | 300 | 300 | 300 | 300 | 300 |

TABLE 2-continued

Contrastive Analysis of Different Processing Schemes

| Process | Embodiment 1 | Embodiment 2 | Embodiment 3 | Embodiment 4 | Comparative Embodiment 1 |
|---|---|---|---|---|---|
| Mass ratio of catalyst to oil in the second heavy oil reaction zone | 6 | 6 | 6 | 6 | 6 |
| The second heavy oil reaction time, s | 1.0 | 1.0 | 1.0 | 1.0 | 1.8 |
| Reaction pressure in the second heavy oil reaction zone, MPa | 0.1 | 0.1 | 0.1 | 0.1 | 0.1 |

Table 3 Distribution of Main Products

TABLE 3

Distribution of Main Products

| Product distribution, wt % | Embodiment 1 | Embodiment 2 | Embodiment 3 | Embodiment 4 | Comparative Embodiment 1 |
|---|---|---|---|---|---|
| Gas | 78.15 | 76.47 | 76.78 | 76.07 | 71.92 |
| Dry gas | 46.64 | 45.77 | 45.32 | 45.08 | 43.87 |
| Liquefied petroleum gas | 31.51 | 30.70 | 31.46 | 30.99 | 28.05 |
| Liquid |  |  |  |  |  |
| Gasoline | 10.41 | 10.91 | 10.55 | 11.00 | 13.18 |
| Diesel oil | 3.58 | 4.20 | 3.95 | 4.50 | 5.20 |
| Heavy oil | 3.71 | 4.21 | 3.80 | 4.30 | 5.10 |
| Coke | 4.16 | 4.21 | 4.02 | 4.13 | 4.60 |
| Light olefin yield, wt % |  |  |  |  |  |
| Ethylene | 31.85 | 31.15 | 32.01 | 31.70 | 25.52 |
| Propylene | 21.92 | 21.32 | 22.11 | 21.70 | 18.70 |
| Butylene | 8.17 | 8.02 | 8.22 | 8.15 | 7.60 |
| Ethylene + propylene | 53.76 | 52.47 | 54.12 | 53.40 | 44.22 |
| Ethylene + propylene + butylene | 61.93 | 60.49 | 62.34 | 61.55 | 51.82 |
| (Ethylene + propylene)/gas, % | 68.79 | 68.62 | 70.49 | 70.20 | 61.48 |
| (Ethylene + propylene + butylene)/gas, % | 79.25 | 79.10 | 81.19 | 80.91 | 72.05 |
| Content of aromatics in gasoline, wt % | 87.5 | 86.8 | 87.3 | 86.9 | 79.0 |

The above embodiments only describe preferred embodiments of the invention and do not limit the scope of the invention. Without deviating from the design spirit of the invention, all variations and improvements made by those of ordinary skill in the art to the technical solution of the invention shall fall into the protection scope set forth in the Claims of the invention.

What is claimed is:

1. A method for producing chemicals from crude oil by double-tube parallel multi-zone catalytic conversion, comprising the following steps:
   (1) feeding a first raw material at a gas inlet end of a first reaction tube for a cracking reaction in a light alkane reaction zone in the presence of a regenerated catalyst;
   (2) feeding a preheated second raw material in the middle of the first reaction tube and mixing with materials from the light alkane reaction zone before entering a first heavy oil reaction zone for a cracking reaction, wherein a first oil gas after the cracking reaction and a spent catalyst enter a gas-solid separator for separation, the first oil gas passes through a fractionation system for the separation of light alkanes, light olefins, gasoline, cycle oil and oil slurry, and the gasoline enters an aromatics extraction unit and is separated into aromatics and aromatics raffinate; and the spent catalyst subjected to steam stripping enters a regeneration reactor for regeneration reaction with an oxidant;
   (3) feeding a third raw material at a gas inlet end of a second reaction tube for a cracking reaction in a gasoline reaction zone in the presence of a regenerated catalyst, wherein the third raw material is a light hydrocarbon or alcohol raw material; and
   (4) feeding a cycle oil separated in Step (2) or a hydrotreated cycle oil in the middle of the second reaction tube and mixing with materials from the gasoline reaction zone before entering a second heavy oil reaction zone for a cracking reaction to obtain a second oil gas and a spent catalyst, wherein the second oil gas is mixed with the first oil gas to form a resulting mixture, the resulting mixture enters a fractionation system for separation of light alkanes, light olefins, gasoline, cycle oil and oil slurry, and the gasoline enters an aromatics extraction unit and is separated into aromatics and aromatics raffinate; and the spent catalyst subjected to steam stripping enters a regeneration reactor for regeneration reaction with an oxidant.

2. The method according to claim 1, wherein reaction conditions for the light alkane reaction zone are as follows: reaction temperature: 600-800° C., preheating temperature of the first raw material: 40-200° C., mass ratio of catalyst to oil: 5-30, and reaction time: 0.1-5.0 s;
   reaction conditions for the first heavy oil reaction zone are as follows: reaction temperature: 500-700° C., preheating temperature of the second raw material: 150-250° C., mass ratio of catalyst to oil: 5-30, and reaction time: 0.1-5.0 s;
   reaction conditions for the gasoline reaction zone are as follows: reaction temperature: 600-800° C., preheating temperature of the third raw material: 40-200° C., mass ratio of catalyst to oil: 5-30, and reaction time: 0.1-5.0 s; and reaction conditions for the second heavy oil reaction zone are as follows: reaction temperature: 500-700° C., preheating temperature of the cycle oil: 200-350° C., mass ratio of catalyst to oil: 5-30, reaction time: 0.1-5.0 s, and reaction temperature of the regeneration reactor: 600-950° C.

3. The method according to claim 1, wherein the first reaction tube and the second reaction tube are downers, risers or composite bed reactors with swirl feed structures; and the first raw material and the third raw material are fed in a swirl feed mode.

4. The method according to claim 1, wherein the second raw material comprises one or more selected from the group consisting of crude oil, heavy components of crude oil, atmospheric gas oil, vacuum gas oil, coking gas oil, atmospheric residual oil, vacuum residual oil, deasphalted oil, oil sands bitumen, shale oil, coal tar, paraffin, plastics, rubber, rubber oil, synthetic oil, and animal and vegetable oils rich in hydrocarbons.

5. The method according to claim 1, wherein in Step (1) and Step (3), the regenerated catalyst comprises a regenerated catalyst from a regenerator or a regenerated catalyst cooler, or a catalyst with temperature or activity changed from a catalyst mixing tank.

6. The method according to claim 1, wherein the first raw material and the third raw material comprise one or more selected from the group consisting of dry gas, light alkanes, alcohols, light components of crude oil, gasoline aromatics raffinate, straight run gasoline, condensate oil, catalytically cracked gasoline, thermal cracking gasoline, coker gasoline, visbreaking gasoline and pyrolysis to ethylene gasoline.

7. The method according to claim 1, wherein the regenerated catalyst comprises one or more selected from the group consisting of microspheres loaded with alkali and/or alkaline earth metals, calcium aluminate, calcium ferrite, magnesia-alumina spinel, silicate aluminate, calcium silicate, magnesium silicate, alumina and semi-coke.

8. The method according to claim 1, wherein the oxidant is one or more selected from the group consisting of oxygen, air, oxygen-rich air, water vapor, carbon dioxide and methane.

9. The method according to claim 1, wherein the regeneration reactor is one selected from the group consisting of a riser regenerator, a turbulent fluidized bed regenerator, a bubbling fluidized bed regenerator, and any combinations thereof.

10. The method according to claim 1, wherein the gas-solid separator is one selected from the group consisting of an inertial separator, a horizontal cyclone separator, a vertical cyclone separator, and any combinations thereof.

* * * * *